United States Patent
DeLauer

(10) Patent No.: US 6,296,010 B1
(45) Date of Patent: Oct. 2, 2001

(54) AUTOMATIC SHUT-OFF AIR PRESSURE VALVE FOR TIRES

(76) Inventor: Gerard Michael DeLauer, 28819 Chardon Rd., Wickliffe, OH (US) 44092

(\*) Notice: Subject to any disclaimer, the term of this patent is extended or adjusted under 35 U.S.C. 154(b) by 0 days.

(21) Appl. No.: 09/295,200

(22) Filed: Apr. 20, 1999

(51) Int. Cl.⁷ .................................................. F16K 15/20
(52) U.S. Cl. .......................... 137/224; 137/228; 137/230; 137/232; 152/415
(58) Field of Search ................................. 137/224, 227, 137/228, 230, 232; 152/415

(56) References Cited

U.S. PATENT DOCUMENTS

| | | | |
|---|---|---|---|
| 1,128,455 | 2/1915 | Keith | 825/872 |
| 1,273,905 | * 7/1918 | Myers | 137/227 |
| 2,452,527 | 10/1948 | Peter | 152/417 |
| 2,944,579 | 7/1960 | Kamm | 152/416 |
| 2,976,906 | 3/1961 | Kamm | 152/417 |
| 4,015,623 | * 4/1977 | Wanstreet | 137/224 |
| 4,015,624 | * 4/1977 | Wanstreet et al. | 137/224 |
| 4,142,549 | * 3/1979 | Autry | 137/469 |
| 4,418,737 | 12/1983 | Goodell | 152/416 |
| 4,431,043 | 2/1984 | Goodell | 152/417 |
| 4,470,506 | 9/1984 | Goodell | 206/223 |
| 4,702,287 | 10/1987 | Higbie | 141/4 |
| 4,754,792 | 7/1988 | Braun | 152/417 |
| 4,819,686 | * 4/1989 | Achterholt | 137/229 |
| 5,054,511 | * 10/1991 | Tuan et al. | 137/224 |
| 5,180,456 | 1/1993 | Schultz | 152/416 |
| 5,325,902 | 7/1994 | Loewe | 152/419 |
| 5,327,346 | 7/1994 | Goodell | 364/426 |
| 5,553,647 | 9/1996 | Jaksic | 152/415 |
| 6,036,169 | * 3/2000 | Wass | 251/82 |

\* cited by examiner

Primary Examiner—Michael Buiz
Assistant Examiner—Meredith H Schoenfeld
(74) Attorney, Agent, or Firm—John D. Gugliotta; Michael J. Corrigan

(57) ABSTRACT

This invention is an automatic shut-off valve and gauge for tires during inflation. Configured as a double stem valve joined either on the outside or inside the rim of the tire. One stem serves as an air valve for inflating tires with a metal or plastic line attached to it extending into the second stem, which is a valve that regulates the air pressure in the tire. Air supplied during inflation of the tire causes a linkage to move and open a vent to the atmosphere which was otherwise closed. A spring loaded valve is designed to open when the air pressure in the tire exceeds the correct operating pressure and to allow excess air to escape to the atmosphere. A retracting and extending indicia is provided on the top of a spring loaded valve to indicate when the tire is properly inflated to a preset pressure.

6 Claims, 4 Drawing Sheets

AUTOMATIC SHUT-OFF AIR PRESSURE VALVE FOR TIRES

RELATED APPLICATIONS

There are no previously filed, nor currently any co-pending applications, anywhere in the world.

BACKGROUND OF THE INVENTION

1. Field of the Invention

The present invention relates generally to fluid pressure controls and, more particularly, to an automatic shut-off air pressure valve for automobile tires which vents excess supply air after desired tire pressure is achieved.

2. Description of the Related Art

In the related art, it is well known that systems for regulating the pressure in the tires of vehicles exist. Most of these systems have as their objective to adjust and regulate the air pressure in tires according to prevailing road conditions to promote safety, fuel economy, improved traction and reduce tread wear.

These systems fall into two groups. The first group of systems are mounted on the individual wheels of the vehicle. In U.S. Pat. No. 1,128,455 issued to Keith, a flask of compressed air is radially mounted to the spokes of a wheel. Through a combination of regulating valves and tubing also located on the wheel, compressed air is either added or excess tire pressure is vented to the atmosphere to maintain a predetermined air pressure in the tire.

In U.S. Pat. No. 5,325,902 issued to Loewe, et al., a wheel mounted air compressor driven either by a motor/DC generator combination also disposed on the wheel or driven by the rotation of the wheel provides compressed air when required to inflate the tire. The '902 reference contemplates varying tire pressure for the type of road surface through a central monitoring system mounted on the dashboard. Through selection of tire pressure by the driver, the control system would automatically activate the air compressor to increase tire pressure or open a relief valve to vent undesired pressure. A safety relief valve is suggested to prevent overinflation. Although the current invention could be considered to act in essentially the same capacity as the safety relief valve in '902, it is in fact considerably different. For one, there is no disclosure of any design of such a valve, only a suggestion that one may be included to prevent overinflation. '902 also suggests that overinflation may be prevented through compressor design. The current invention is a complete design for an automatic shut off air pressure valve for tires that can be installed on all vehicles with little to no modification of conventional vehicle rims. The relief valve of '902 is part of an integrated tire pressure monitoring and inflation system. There is also no suggestion in '902 that the safety relief valve be designed and used to regulate tire pressure exactly, only to prevent overinflation. The current invention is designed to vent excess pressure when the pressure exceeds the exact operating pressure. Therefore the current invention is considerably different than merely the relief valve suggested in '902.

The second group of systems also have a centralized monitoring system but the compressed air used to inflate the tires is supplied from a centralized compressed air source. The compressed air is delivered to the rotating tires through tubing and rotary pneumatic joints and seals. These systems all have in common a complex means to monitor, evaluate and adjust tire pressure to the optimum pressure for the current road condition. Earlier systems did this through a variety of mechanical and pneumatic means composed of components including but not limited to tubing, valves, seals, and gauges. Examples of these can be found in U.S. Pat. No. 2,452,527 issued to Peter, U.S. Pat. No. 2,944,579 issued to Kamm, and U.S. Pat. No. 2,976,906 issued to Kamm. Other examples of these systems using designs of increasing complexity are U.S. Pat. No. 4,418,737 issued to Goodell, U.S. Pat. No. 4,431,043 issued to Goodell, and U.S. Pat. No. 4,470,506 issued to Goodell. The Goodell patents are directed to application in military vehicles and is essentially the same system in each patent with the original design patented in '737, a retrofit kit of the design provided in '506, and additional matter added and disclosed in '043. More sophistication was added to these type of central control systems with the addition of electronic control devices in U.S. Pat. No. 4,702,287 issued to Higbie, et al. and U.S. Pat. No. 4,754,792 issued to Braun, et al. Even more sophisticated control systems employing digital logic and a microprocessor were patented in U.S. Pat. No. 5,180,456 issued to Goodell, and in U.S. Pat. No. 5,180,456 issued to Schultz, et al. U.S. Pat. No. 5,553,647 issued to Jaksic also employs a state-of-the-art microprocessor control system but has both an inflation valve and deflation valve assembly installed on the wheel's rim.

The present invention differs from each of the aforementioned inventions because the present invention does not disclose a compressed air source or a central control system. Nor is it an object of the present invention to provide a means to automatically deflate the tire to a lower designated pressure to adjust for road conditions. The purpose of the present invention is to vent excess air from the tire upon filling once a predetermined air pressure has been reached. This eliminates the need for a pressure gauge and the possibility of overinflating the tire. The present invention does not have the enormous complexity of the prior art and fulfills the needs of the average vehicle owner who doesn't need or want the expense of a complex system to ensure their tires are at the correct operating pressure. The present invention is simple, inexpensive, and requires little to no modification of existing automobile components for its installation and operation.

SUMMARY OF THE INVENTION

It is therefore an object of the present invention to provide a tire valve that vents excess supply air once the pressure of the tire reaches a predetermined operating pressure.

It is another object of the invention to provide a retracting/extending indicator on the tire discharge valve to indicate the tire is filled to a predetermined operating pressure.

It is yet another object of the invention to provide a tire valve that eliminates the need for a pressure gauge to check tire pressure.

It is still yet another object of the invention to allow inflation of the tires in a conventional manner.

It is yet still another object of the invention to save the vehicle owner money by extending tire tread life and tire performance through the inflation of tires at the proper pressure.

It is yet still another object of the invention to speed up the time it takes to inflate tires.

It is yet still another object of the invention to prevent over-inflation of tires.

It is yet still another object of the invention to provide a means to prevent excess tire pressure caused by bumps in the driving surface from opening the excess tire pressure valve.

Briefly described according to one preferred embodiment of the present invention, an automatic shut-off air pressure valve for tires is provided comprising a tire valve stem with a valve for inflating a tire connected to a second stem through an orifice. The second stem contains a means whereby excess tire pressure can be vented to the atmosphere via the orifice. A sliding linkage is provided from the inflation valve stem through the orifice to the inner wall of discharge valve stem to form a seal on the atmospheric discharge vent to prevent tire pressure from escaping when the tire is in operation. A retracting /extending indicia is further provided at the head of the discharge valve stem to indicate when the tire has reached a predetermined air pressure.

In an alternate second preferred embodiment of the invention, the screw type cap replaces the sliding linkage to prevent tire pressure from escaping when the tire is in operation. The orifice is replaced by an interconnecting conduit.

In an alternate third preferred embodiment of the invention, the sliding linkage is replaced with a slide hatch top biased in the shut position by a spring to prevent tire pressure discharge through the discharge valve stem when the tire is in operation. The orifice is replaced by an interconnecting conduit.

In an alternate fourth preferred embodiment of the invention, a separate tire inflation valve stem and discharge stem are provided. An interconnecting conduit is provided on the interior side of the tire rim wall to connect the inflation valve stem to the discharge stem assembly. A sliding linkage is provided on the interior side of the tire rim wall from the inflation valve stem to the inner wall of the discharge valve stem to form a seal on the atmospheric discharge vent to prevent tire pressure from escaping when the tire is in operation. A retracting/extending indicia is further provided at the head of the discharge valve stem to indicate when the tire has reached a predetermined air pressure.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

LIST OF REFERENCE NUMBERS

10 Tire
11 Conventional Tire Rim
11a Outer Tire Rim Wall
11b Interior Tire Rim Wall
12 Automatic Shut-Off Air Pressure Valve for Tires
13 Inflation Stem
14 Tire Valve and Core Assembly
15 Sliding Linkage
15a First Member
15b Second Member
15c Third Member
16 Orifice
17 Discharge Valve Stem
17a Valve Stem Inner Wall
17b Valve Stem Outer Wall
17c Discharge Valve Interior
17d Discharge Valve Upper Chamber
18 Atmospheric Vent
19 Spring
20 Plate
20a Upper Plate
20aa Upper Plate Orifice
20b Lower Plate
20bb Lower Plate Orifice
21 Valve Body Assembly
21a Head
21b Shaft
21c Disc Shaped Lower Plate
22 Valve Assembly Orifice
22a Deflation Valve Orifice
23 Tire Chamber/Interior Cavity
24 Screw Cap
25 Conduit
26 Slide Hatch Top
27 Spring

DESCRIPTION OF THE PREFERRED EMBODIMENTS

The best mode for carrying out the invention is presented in terms of its preferred embodiment, herein depicted within the following Figures.

1. Detailed Description of the Figures

Figure 1:
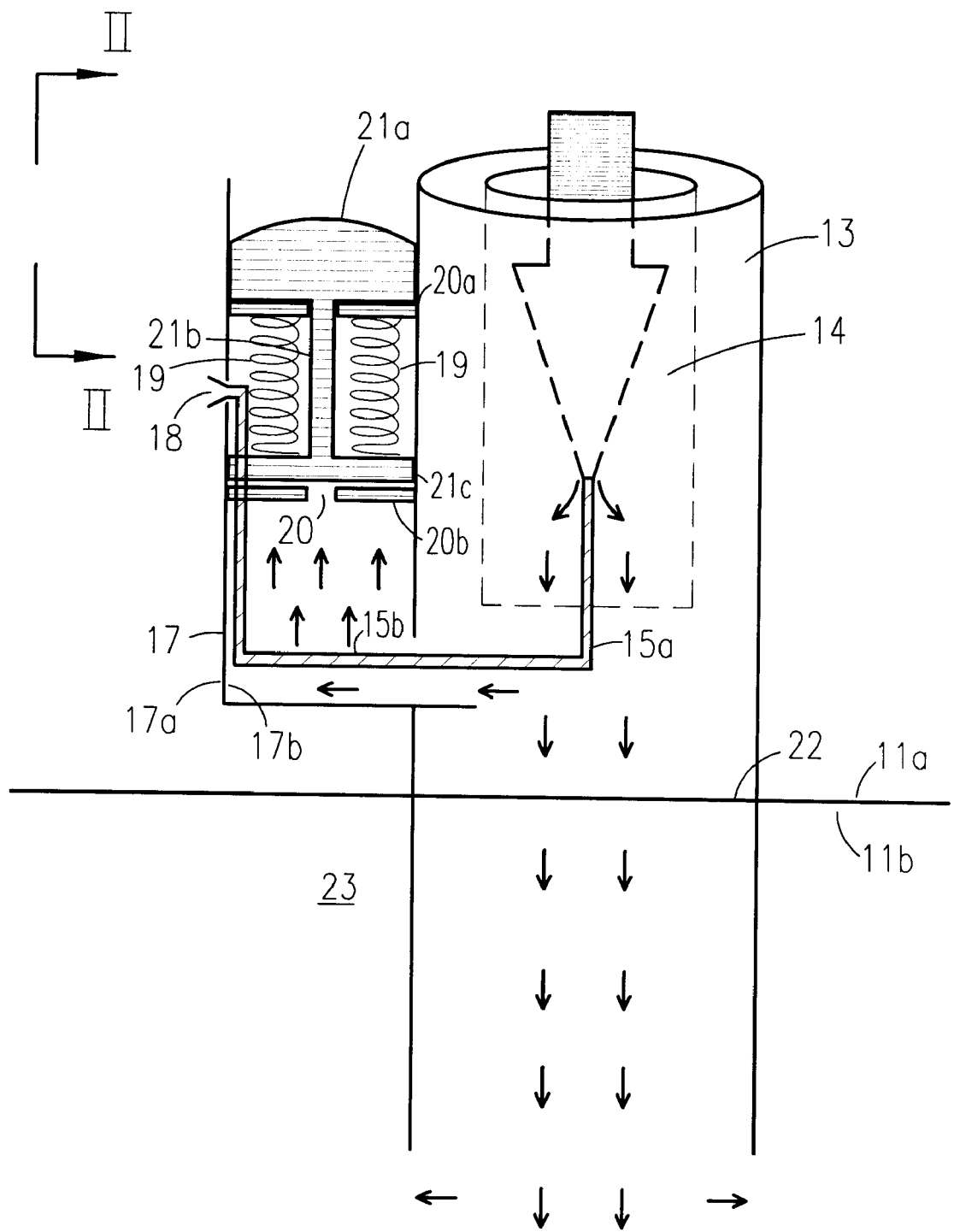
FIG. 1 is a longitudinal cross sectional front plan view of the preferred embodiment of the invention taken along line II-II of the invention shown in FIG. 2.

Referring to FIG. 1, automatic shut-off air pressure valve for tires 12 is mounted on the outer wall 11a of an otherwise conventional tire rim 11 through orifice 22 penetrating tire rim 11 for providing a conduit into the interior cavity 23 of the tire 10. A downwardly sliding linkage 15 comprised of a first member 15a, a second member 15b, and a third member 15c is provided. First member 15a of sliding linkage 1 is positioned in tire inflation valve stem 13 in such a manner as to receive inlet air flow from conventional tire valve and core assembly 14 and linearly and slidably translate in a downwardly direction. Second member 15b of sliding linkage 15 is in physical communication with and communicates said downwardly movement of first member 15a to third member 15c. Second member 15b traverses orifice 16 defined by the outer wall of inflation stem 13 and the interior wall 17a of discharge valve stem 17. Orifice 16 allows free communication of fluid between inflation stem 13 and discharge valve stem 17. Third member 15c is positioned against interior wall 17a of discharge valve stem 17 in such a manner as to act as a seal of atmospheric vent 18 in the wall of discharge valve stem 17. Discharge valve stem 17 is divided into two chambers with an interior chamber 17c defined by the inner wall 17a of said discharge valve 17 and a lower plate 20b, and an upper chamber 17d defined by an upper plate 20a, said inner wall of said discharge valve 17, and said lower plate 20b. Interior chamber 17c and upper chamber 17d are in fluid communication with each other through an orifice 20bb formed in said lower plate 20b. The downwardly movement of linkage 15 caused by inlet air received from conventional tire valve and core assembly 14 puts atmospheric vent 18 in free fluid communication with said interior chamber 17c of discharge valve stem 17 allowing free communication of fluid within interior chamber 17c to the atmosphere. However, free fluid communication to the atmosphere is still blocked by valve body assembly 21 which acts as a barrier to fluid within chamber 17c preventing discharge through atmospheric vent 18 to the atmosphere. Valve body assembly 21 is comprised of a head 21a, having an upper surface and lower surface, said head connected on its lower surface to one end of a downwardly extending shaft 21b and connected on the opposite end to the upper surface of a disc shaped lower plate 21c, said disc shaped lower plate 21c also having a lower surface. The valve body assembly 21 is held in position in discharge valve stem 17 by interior wall 17a of discharge valve stem 17 and upper plate 20a and lower plate 20b. The bottom surface of the disc shaped lower plate 21c of valve body assembly 21 is biased by springs 19 against the upper surface of lower plate 20b. Springs 19 have one end biased against the lower surface of upper plate 20a and the other end on the upper surface of disc shaped lower plate 21c. Fluid is free to communicate to the lower surface of disc shaped lower plate 21c through orifice 20bb formed in the center of lower plate 20b. Fluid pressure in discharge valve stem 17 in excess of spring's 19 rated bias strength forces valve body assembly 21 in an upwardly direction. When valve body assembly 21 has traveled in an upwardly direction such that the lower surface of disc shaped lower plate 21c has traveled past atmospheric vent 18, fluid from valve body assembly 21 is free to communicate to the atmosphere through atmospheric vent 18. When fluid pressure in discharge valve stem 17 is not in excess of spring's 19 rated bias strength, the lower surface of head 21a rests against the upper surface of plate 20a. The upper surface of head 21a is visible to the naked eye giving visible indication of the relative position of valve body assembly 21 and whether tire is at proper pressure. If head 21a is extended in an upwardly direction, tire 10 has reached operating pressure and excess air is being vented. If head 21a reseats, tire 10 is at operating pressure.

Figure 2:
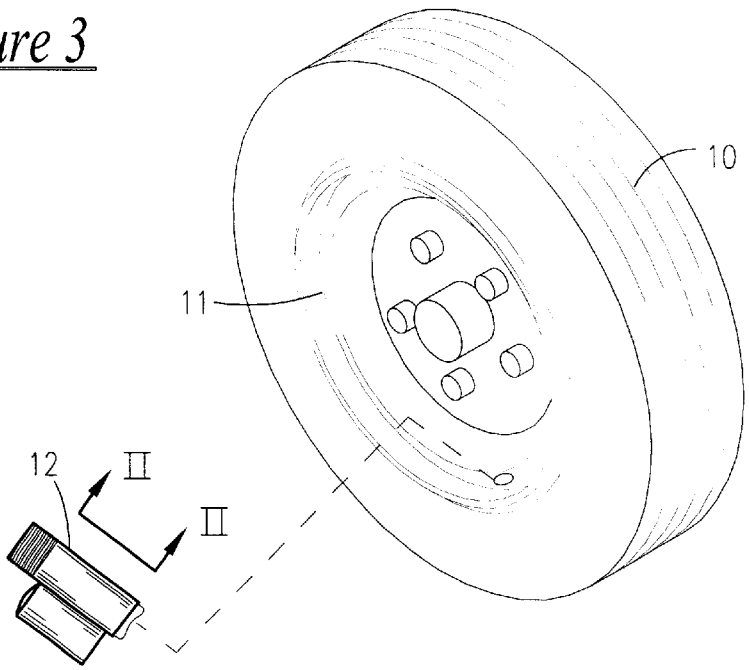
FIG. 2 is an exploded perspective view of the preferred embodiment of the present invention shown affixed/attached to an air pressure valve for tires.

Referring now to FIG. 2, an automatic shut-off air pressure valve for tires 12 is shown positioned in a conventional manner on the outer wall 11a of vehicle tire rim 11.

Figure 3:
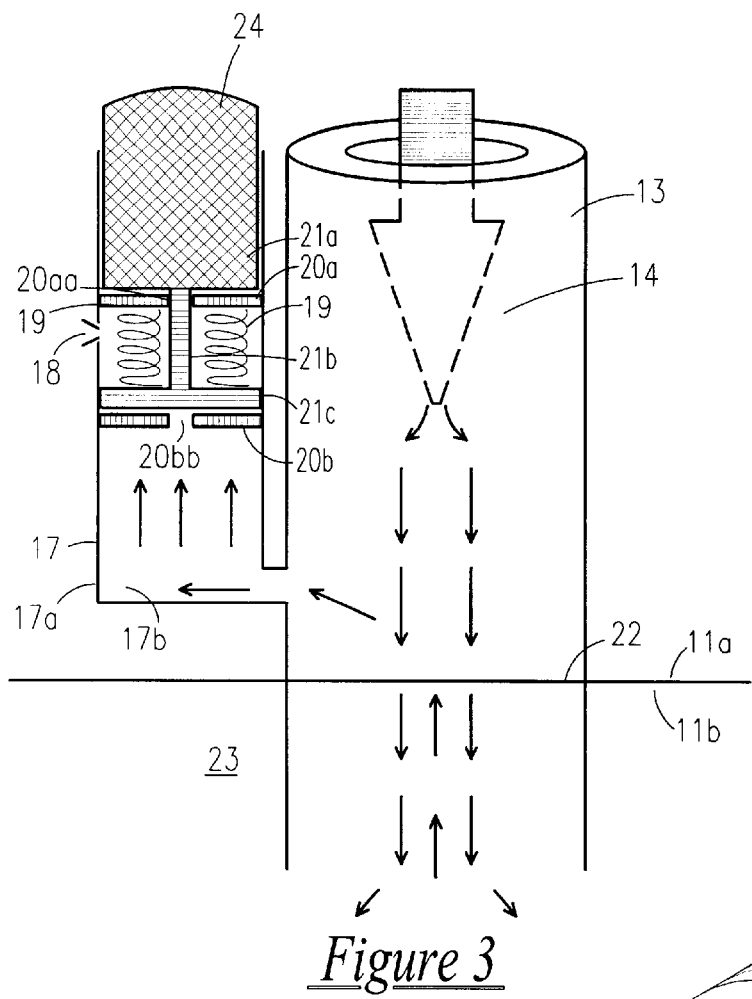
FIG. 3 longitudinal cross sectional front plan view of an alternate second preferred embodiment of the invention.

Referring to FIG. 3, a second preferred embodiment of the invention is shown where sliding linkage 15 has been eliminated and replaced with screw type cap 24 as the means to prevent temporary excess pressure from escaping while tire 10 is in operation. Orifice 16 has been replaced by conduit 25.

Figure 4:
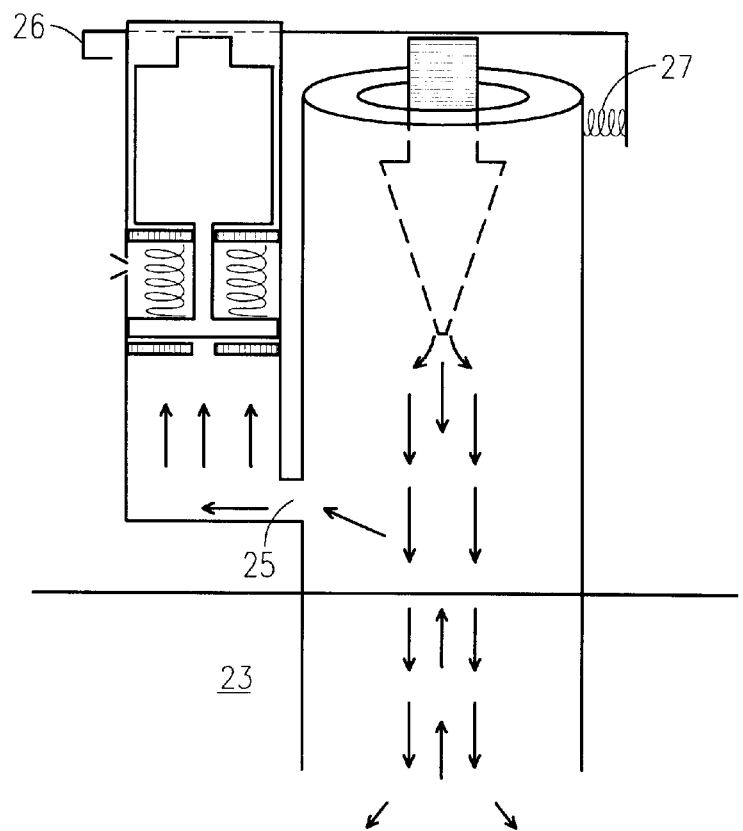
FIG. 4 longitudinal cross sectional front plan view of an alternate third preferred embodiment of the invention.
Figure 5A:
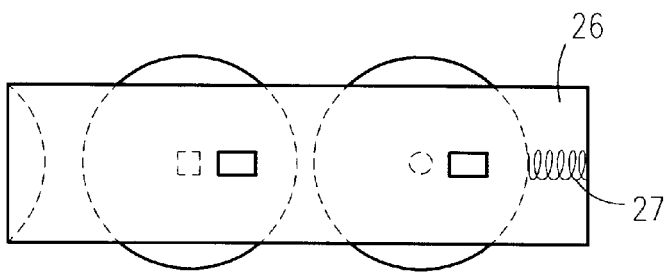
FIG. 5a is a top plan view of the sliding hatch top of the invention of FIG. 4 shown in the closed position.
Figure 5B:
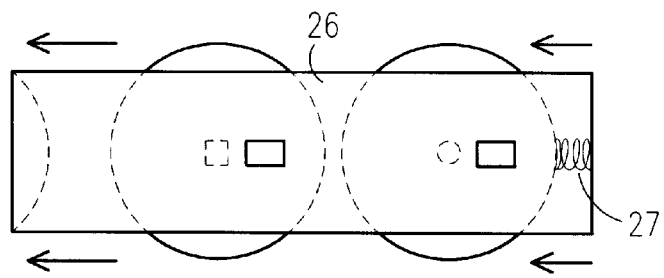
FIG. 5b is a top plan view of the sliding hatch top of the invention of FIG. 4 shown in the open position.

Referring to FIGS. 4, 5a and 5b, a third preferred embodiment of the invention is shown where sliding linkage 15 has been eliminated and replaced with slide hatch top 26 and spring 27 as the means to prevent temporary excess pressure from escaping while tire 10 is in operation. Orifice 16 has been replaced by conduit 25. FIG. 5b shows the slide hatch top 26 in the open position while FIG. 5b shows the slide hatch top 26 biased by spring 27 in the closed position.

Figure 6:
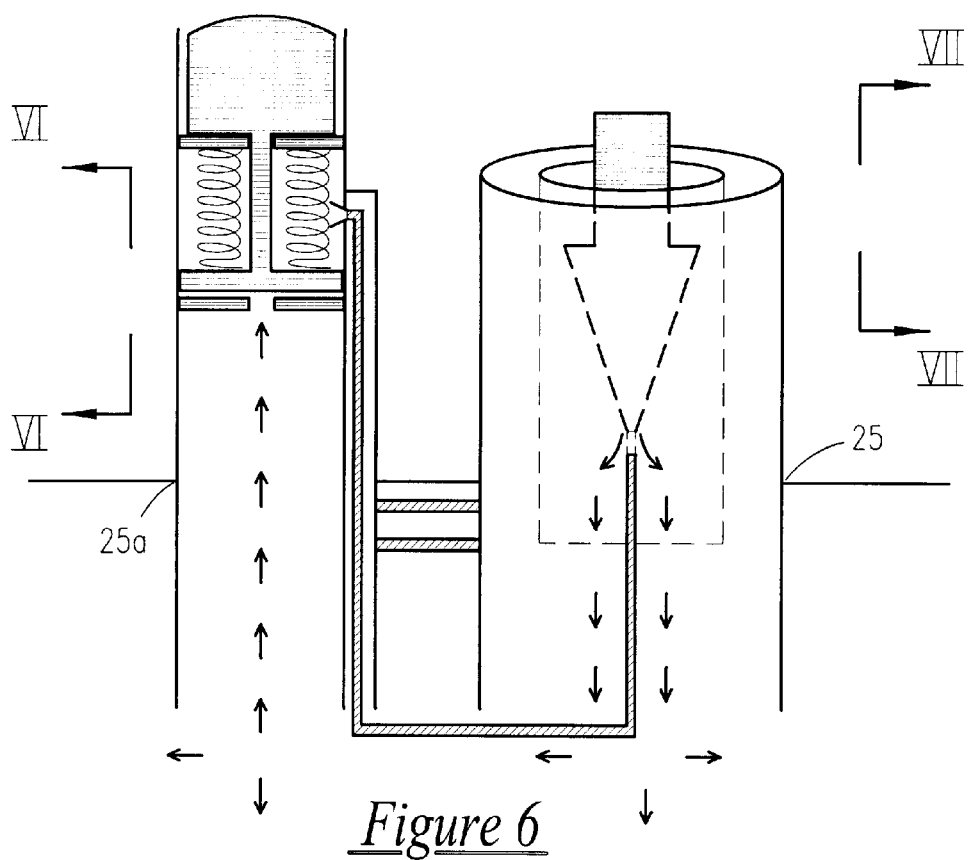
FIG. 6 is a longitudinal cross sectional view of an alternate fourth preferred embodiment of the invention taken along line VI—VI of the invention shown in FIG. 7.

Referring to FIG. 6, a fourth preferred embodiment of the invention is shown taken along line VII—VII where inflation stem 13 and discharge valve stem 17 are independently installed on the outer wall 11a of tire rim 11 through orifices 25 and 25a and free to communicate with fluid in the tire chamber 23 formed by interior rim wall 11b and tire 10. Sliding linkage 15 serves the same purpose as in the preferred embodiment but has been placed within tire chamber 23 with member 15a placed as before in inflation stem 13 and member 15c placed as before in discharge valve stem 17 with member 15b communicating the movement between them. Orifice 16 has been replaced by conduit 25.

Figure 7:
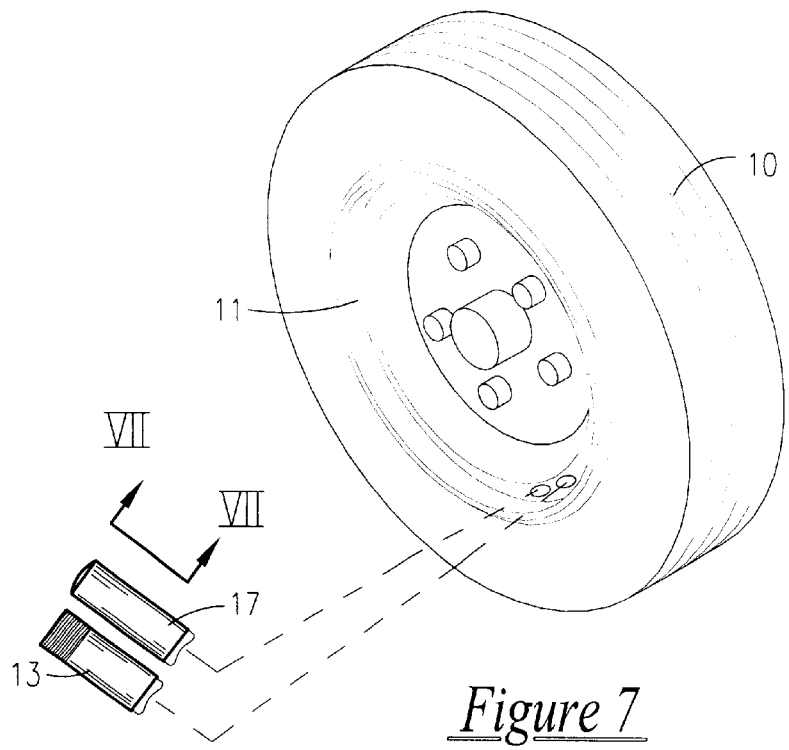
FIG. 7 is an exploded perspective view of the invention shown in FIG. 6.

Referring to FIG. 7, shown is an exploded perspective view of the invention of FIG. 6.

The foregoing description is included to illustrate the operation of the preferred embodiment and is not meant to limit the scope of the invention. The scope of the invention is to be limited only by the following claims.

What is claimed is:

1. An automatic shut-off air pressure valve for tires, said valve comprised of:

an inflation valve stem, wherein said inflation valve stem is mounted on an outer wall of a conventional tire rim and in fluid communication with an interior cavity of said tire through an orifice penetrating said tire rim for providing a conduit for receiving supply air from a compressed air source;

a discharge valve stem, said discharge valve stem located adjacent to said inflation valve stem, wherein said discharge valve stem comprises an interior chamber, said interior chamber defined by a lower plate and an inner wall of said discharge valve, an upper chamber, said upper chamber defined by an upper plate, said inner wall, and said lower plate, and in fluid communication with said interior chamber: and wherein said discharge valve vents air from within said interior chamber when said air is in excess of a pre-determined air pressure:

said disc shaped lower plate of said valve body assembly further comprises a spring, said spring biasing an upper surface of said lower plate against said lower surface of said disc shaped lower plate;

said spring having one end biased against said upper plate and the other end on said upper surface of said disc shaped lower platean an interconnecting means for placing said tire inflation valve stem and said discharge valve stem in fluid communication, wherein said interconnecting means is an orifice defined b an outer wall of said inflation stem and said interior wall of said discharge valve stem; and a discharge prevention means for preventing discharge of air from said discharge valve stem while said tire is in operation; and wherein fluid communication from said interior chamber to the atmosphere through said discharge valve vents is blocked by a valve body assembly when air within said interior chamber is below a pre-determined pressure, and wherein said valve body assembly is comprised of a head, said head having an upper and lower surface, a downwardly extending shaft having a first end opposite a second end, said first end connected to said lower surface, a disc shaped lower plate having an upper and lower surface, said upper surface connected to said second end; and wherein said valve body assembly is held in position within said discharge valve stem by an interior wall of said discharge valve stem and said upper plate and said disc shaped lower plate said lower surface of said head rests against said upper surface of said upper plate when fluid pressure in said discharge valve body is not in excess of said spring's rated bias strength.

2. The automatic shut-off air pressure valve for tires of claim 1, wherein said discharge prevention means consists of a downwardly sliding linkage, said downwardly sliding linkage comprised of:

a first member, said first member positioned in said inflation valve stem such as to receive inlet air flow from a conventional tire valve and core assembly and linearly and slidably translate in a downwardly direction;

a second member, said second member traversing said orifice and being affixed in direct physical communication with said first member; and a third member, said third member in direct physical communication with said second member positioned against said interior wall of said discharge valve stem such as to act as a seal of an atmospheric vent formed in a wall of said discharge valve stem.

3. The automatic shut-off air pressure valve for tires of claim 2, wherein the downwardly movement of said sliding linkage caused by inlet air received from said conventional tire valve and core assembly prevents fluid communication of said interior chamber of said discharge valve stem with said atmospheric vent.

4. The automatic shut-off air pressure valve for tires of claim 3, wherein an upper surface of said head is visible to a naked eye giving visible indication of the relative position of said valve body assembly and indicating whether said tire is at proper pressure; and said head extending in an upwardly direction indicating said tire has reached operating pressure and excess air is being vented, and said head being reseated when said tire is at operating pressure.

5. The automatic shut-off air pressure valve for tires of claim 1, wherein fluid is free to communicate to said lower surface of disc shaped lower plate through an orifice formed in the center of said lower plate.

6. The automatic shut-off air pressure valve for tires of claim 1, wherein fluid pressure within said interior chamber of said discharge valve stem in excess of said springs rated bias strength forces said valve body assembly in an upwardly direction, and when said valve body assembly has traveled in an upwardly direction such that said lower surface of said disc shaped lower plate has traveled past said atmospheric vent, fluid from said valve body assembly is free to communicate to the atmosphere through said atmospheric vent.

* * * * *